A. Lapham,
Steam Trap
№ 36,522. Patented Sep. 23, 1862.
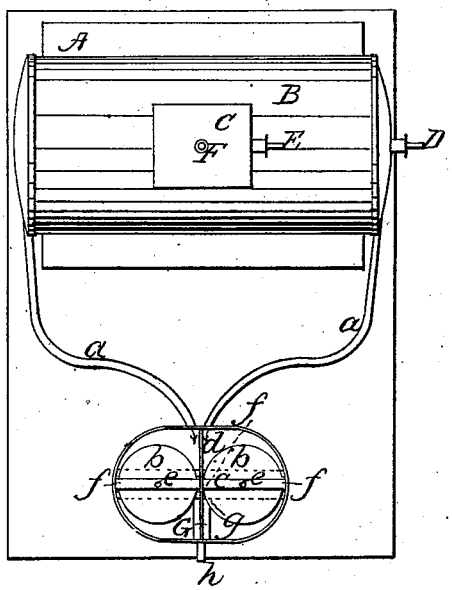
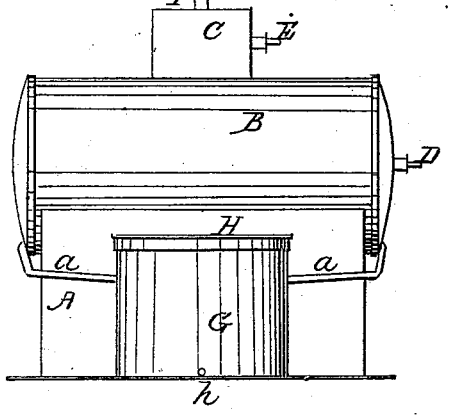
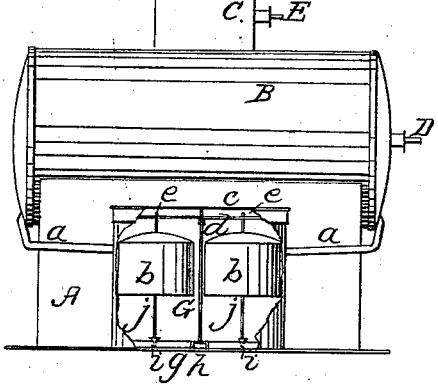
Witnesses:
Julius Brown
C. R. Eastman
Inventor
Allen Lapham

UNITED STATES PATENT OFFICE.

ALLEN LAPHAM, OF BROOKLYN, NEW YORK.

IMPROVED STEAM-TRAP.

Specification forming part of Letters Patent No. 36,522, dated September 23, 1862.

*To all whom it may concern:*

Be it known that I, ALLEN LAPHAM, of Brooklyn, Kings county, New York, have invented a new and Improved Method of Relieving Steam-Engine Cylinders of Condensed Water; and I do hereby declare the following to be a full, clear, and exact description thereof, reference being had to the accompanying drawings, figures, and letters of reference thereon, making part of this specification.

Of the said drawings, Figure 1 represents a top view. Fig. 2 is a front elevation having the shell of the trap removed to show the mechanism thereof. Fig. 3 is a front elevation.

Similar letters of reference indicate like parts in all the drawings.

My invention consists in combining with a steam-engine cylinder a double steam-trap for relieving the cylinder of the water of condensation without waste of steam or attendance from the engineer, as will be more fully shown hereinafter.

To enable others skilled in the art to make and use my invention, I will describe the construction and operation thereof.

A, B, C, D, E, and F represent the various parts of a steam-engine.

G is a steam-trap, to which are attached pipes $a\,a$, leading from the lowest point of each end of the cylinder, as shown in the drawings, and of the proper size to relieve the cylinder of the water of condensation.

The trap is constructed as follows: G represents a metal shell provided with a suitable cap, H, which is to be bolted thereto steam-tight. In the bottom of the trap there is cast a channel by means of cores extending across the trap, as shown in the dotted lines in Fig. 1, while another channel, $g$, connecting therewith, forms the discharge. In the main channel the seats are bored for the valves $i\,i$, which are secured to the valve-rods $j\,j$ and are properly ground to fit the seats. The valve-rods have their bearings at the bottom by a spindle or valve-stem, as seen in the dotted lines in Fig. 2, while the upper ends are guided by the rods passing through the bar $c$ at $e\,e$, which bars are secured at mortises $f\,f$, as shown in Fig. 1. Secured to the valve-rods are floats $b\,b$ of the form of an inverted disk. The trap is divided by a diaphragm or partition, $d$, as seen in Figs. 1 and 2.

Operation: The condense-water in the cylinder will be driven by the travel of the piston into the pipes $a\,a$, and thence into the respective partitions in the trap G, as seen in Fig. 1, until sufficient water has accumulated in the trap to seal the under side of the floats $b\,b$, which lifts the valves $i\,i$ in proportion to the amount of water and allows the water to pass out of the discharge-pipe $h$ automatically without any escape of steam.

I do not here claim, broadly, the combination of a steam-trap with the cylinder of a steam-engine, for that is the subject of a previous application by me for Letters Patent.

I claim—

The combination, with a steam engine cylinder, of a double trap constructed and operating substantially as described, and for the purpose set forth.

ALLEN LAPHAM. [L. S.]

Witnesses:
JULIUS BROWN,
C. R. EASTMAN.